Jan. 5, 1971 G. E. HENDRICKS 3,552,771
LOAD DISTRIBUTING TRAILER HITCH
Filed March 28, 1969 2 Sheets-Sheet 1

INVENTOR.
GROVER E. HENDRICKS
BY
Hobbs & Green
ATTORNEYS

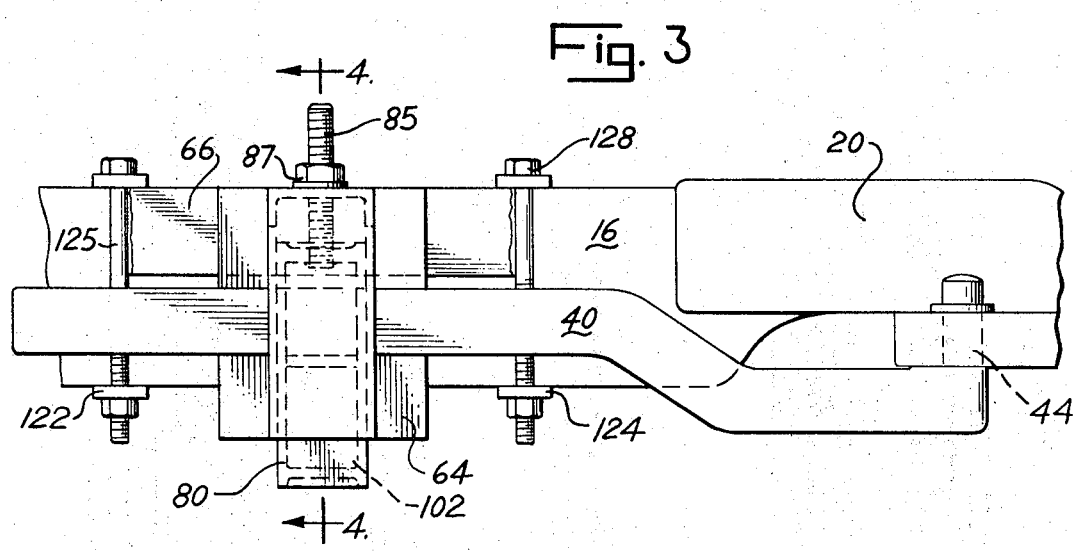
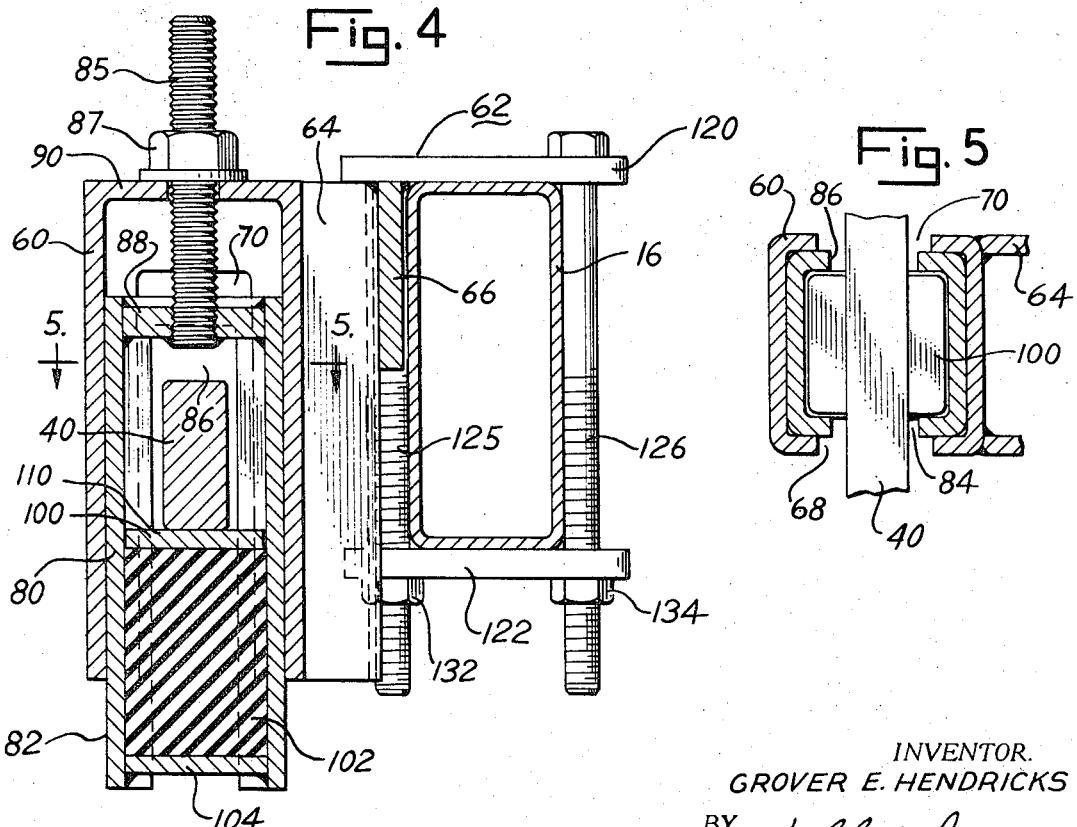
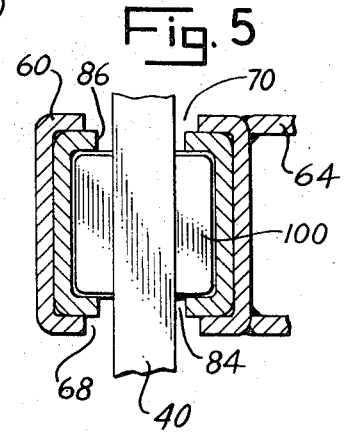

United States Patent Office 3,552,771
Patented Jan. 5, 1971

3,552,771
LOAD DISTRIBUTING TRAILER HITCH
Grover E. Hendricks, 2241 Lake St.,
Niles, Mich. 49120
Filed Mar. 28, 1969, Ser. No. 811,296
Int. Cl. B60d 1/06
U.S. Cl. 280—406                                10 Claims

ABSTRACT OF THE DISCLOSURE

A load distributing trailer hitch having a ball mount and two rearwardly extending load distributing bars connected to the ball mount on vertical axes in laterally spaced relation to the ball and a support device for the rear ends of each of the bars having a housing with a carriage slidable vertically therein. The bars rest on a friction plate mounted in the carriage, and the friction plate is supported by a resilient member which absorbs the shock and excess stresses resulting from variations in load during the normal operation of the vehicles. The carriage is adjustable to various heights relative to the frame to obtain optimum load distributing conditions.

---

A well known type of trailer hitch consists of a ball joint interconnecting the tractive vehicle and trailer, and a pair of load equalizing bars pivoted on and extending rearwardly from the ball mount along the sides of the tongue of the trailer. The rear end of each load equalizing bar is supported by a chain or other means which permits the bars to move endwise when the vehicles are negotiating a curve, and which permits the degree of tension on the bars to be adjusted upwardly or downwardly to obtain a substantially level relationship between the towing vehicle and the trailer. The two spring bars are pivoted on the ball mount in laterally spaced relation, and in some of the prior hitches, including the type having the chain suspension for the spring bars, the tension on the spring bars assists in returning and retaining the vehicles in a straight line relation and tends to minimize sway of the trailer in response to wind, uneven and slippery roads, and passing vehicles. These prior load equalizing and sway control type trailer hitches have certain disadvantages and inherent deficiencies which prevent them from giving optimum or maximum performance under certain operating conditions, including difficulty in negotiating rather sharp turns, accidental uncoupling, and difficulty in adjusting the suspension means for the spring bars to obtain optimum performance and in maintaining the setting under all normal operating conditions. Further, when the vehicles are operating under adverse road conditions and negotiating sharp curves, the prior hitches are usually incapable of adjusting adequately and automatically to those conditions, and hence place undue strain on the vehicle and hitch parts. It is therefore one of the principal objects of the present invention to provide a load distributing trailer hitch having load distributing bars of the aforementioned general type, in which tension on the bars can be precisely and conveniently adjusted to obtain optimum operation of the hitch and the vehicle coupling, and in which the degree of lift provided by the bars will be precisely adjusted and effectively controlled.

Another object of the invention is to provide a load equalizing hitch having laterally extending bars for equalizing the load between the towed and the towing vehicles, in which the bars are essentially rigid and inflexible and the load equalizing forces transmitted through the bars are controlled and adjusted by devices mounted rigidly on the trailer near the rear end of the bars.

Still another object of the invention is to provide a hitch of the aforementioned type which can be easily assembled, safely used under adverse conditions, and in which the forces reacting on the bars can be accurately distributed therebetween by making one or two simple, easily made adjustments.

A further object is to provide a load distributing trailer hitch of the aforementioned type in which the support devices for the rear end of the bars are interchangeable from right to left, and are rugged, reliable and easily attached to the trailer frame, and are constructed as a self-contained unit with the operating parts essentially enclosed and effectively protected.

Additional objects and advantages of the invention will become apparent from the following description and accompanying drawings, wherein:

FIG. 3 is a side elevational view of a portion of the hitch shown in the preceding figures;

FIG. 4 is an enlarged vertical cross-sectional view of the portion of the hitch shown in FIG. 3, the section being taken on line 4—4 of the latter figure; and FIG. 5 is a fragmentary horizontal cross-sectional view of a portion of the hitch, this section being taken on line 5—5 of FIG. 4.

Figure 1:
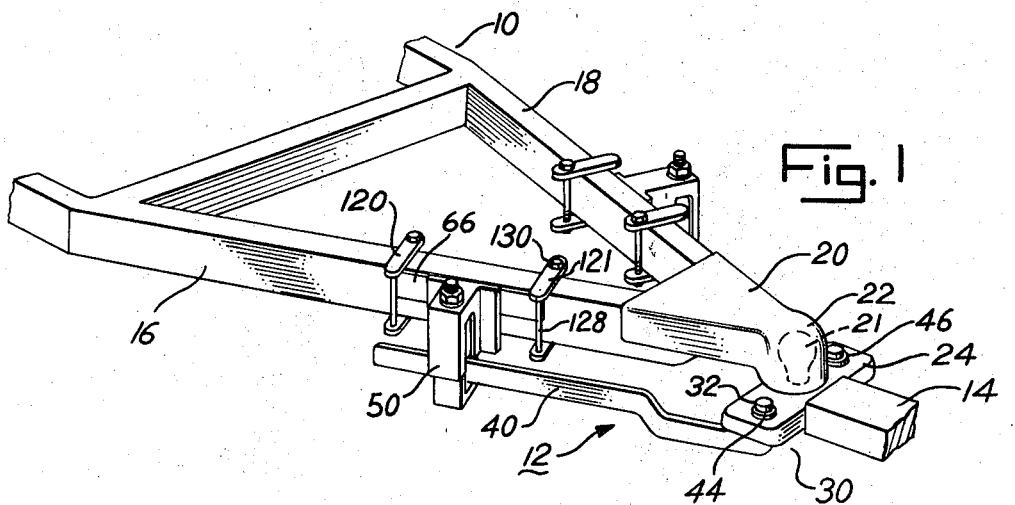
FIG. 1 is a perspective view of a portion of a trailer frame and draw bar, showing the hitch embodying the present invention mounted thereon.
Figure 2:
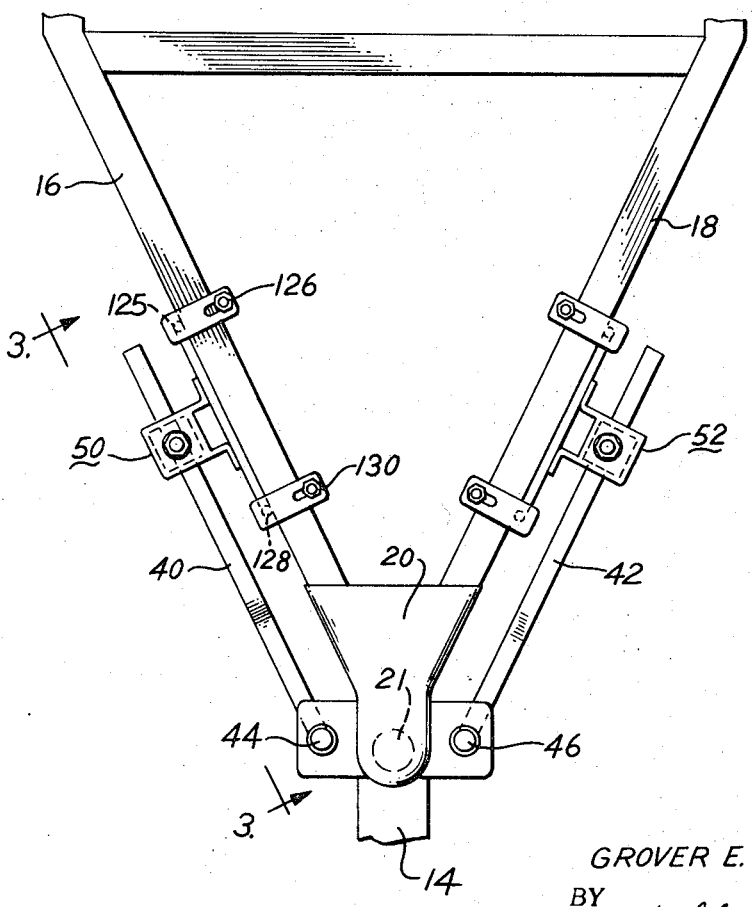
FIG. 2 is a top plan view of the trailer frame, draw bar and hitch shown in FIG. 1.

Referring more specifically to the drawings and to FIGS. 1 and 2 in particular, numeral 10 designates generally a trailer frame on which the present hitch 12 is mounted, and numeral 14 indicates an end of a draw bar mounted to the towing vehicle (not shown). The trailer frame 10 is conventional in construction, with the angular frame members 16 and 18 coming to a point at the forward end and being connected to each other by a ball hitch member 20, having a socket and a ball 21 enclosed in the forward end as illustrated by numeral 22. The ball is mounted on a ball hitch member 24 which is rigidly attached to draw bar 14. The ball and socket of hitch portion 22 permit the two vehicles to swivel angularly to one another in negotiating turns both to the right and to the left as the towing vehicle tows the trailer. The draw bar 14 is normally secured to the frame of the vehicle; however, other types may be used, such as those secured to the axle of the towing vehicle. The draw bar, frame and ball and socket are considered conventional for the purpose of the present description, and the present hitch may be adapted to various types of frame and draw bar constructions.

The ball hitch assembly indicated generally by numeral 30 includes a body portion 32 having the ball 21 mounted rigidly thereon, and a means for attaching the ball hitch to the draw bar. The body extends laterally on either side of the ball, and the two ends of the body swivel relative to the frame members 16 and 18 of the trailer as the two vehicles negotiate turns. The present hitch includes load equalizing bars 40 and 42 pivotally attached to the ball hitch by vertically extending pins 44 and 46, respectively, rigidly secured to the forward ends of the bars and extending upwardly through holes in body portion 32 spaced laterally on either side of the ball. Various types of ball hitches and connecting structures between the two bars may be used. Since angular pivoting of the two vehicles relative to one another causes the lateral portion of the body 32 to move angularly relative to the two trailer frame members 16 and 18, the two bars are caused to move forwardly and rearwardly in substantially parallel relation with the respective frame members 16 and 18.

The rear ends of bars 40 and 42 are supported by devices indicated generally by numerals 50 and 52, respectively, mounted on frame members 16 and 18. The two devices are identical in construction and operation and can be used interchangeably between the right and left sides of the trailer without modification; consequently, only one of the two devices will be described in detail herein. Each bar support device consists of a housing 60 rigidly connected to bracket 62 by a member 64 welded or otherwise joined to the housing and to a downwardly extending plate 66 of the bracket. The housing is provided with vertically positioned slots 68 and 70 on the opposite sides thereof, in parallel relation with the bar, and through which the bar extends when being supported by the support device. As seen in FIG. 5, the housing is of a generally rectangular cross-sectional shape, and the bars extend horizontally therethrough. The housing contains an adjustable carriage 80 having a body 82 with slots 84 and 86 on opposite sides thereof corresponding in position to slots 68 and 70 in outer housing 60. The carriage 80 is supported and adjusted vertically by a threaded shaft 85 and nut 87, the threaded shaft being rigidly secured to the upper end of the carriage by a plate 88 mounted rigidly in the upper end of housing 80 by welding or other suitable securing means. Nut 87 seats on the upper side 90 of housing 60, and when the nut is tightened, the carriage is moved upwardly to adjust the respective load equalizing bar extending through slots 84 and 86 of the carriage and slots 68 and 70 of main housing 60. The bars are supported in the carriage on a horizontal plate 100, which in turn is supported by a resilient member 102 of rubber or rubber-like material which is compressed as the load on the spring bars is increased. The resilient member 102 is firmly supported in the carriage by the side walls of housing 82 and lower end wall 104 rigidly secured in housing 82. The carriage is adjustable to various heights by the movement thereof vertically in housing 60 as nut 87 is rotated in one direction or the other on shaft 85.

The upper side 110 of plate 100 forms a friction surface which resists the endwise movement of the respective load equalizing bar thereon, and by this action tends to minimize the side sway of the vehicles as they are traveling in a generally straight line. The frictional engagement between the bar 40 or 42 and the upper surface of the plate also eliminates or minimizes whipping or side sway, normally resulting from cross-winds and air currents created by passing vehicles. While plate 100 is shown as a metal plate, it may be of other types of materials which will provide substantial friction between the upper surface thereof and the bar, or the plate may be of metal or other material with a friction material forming merely the upper layer thereof.

The bracket 62 includes horizontal members 120 and 121 secured to plate 66 which seat on the upper surface of the trailer frame member 16, is illustrated in the drawings. This bracket assembly is held in place on the trailer frame by cross members 122 and 124 with bolts or studs 125 and 126 at the rear of the support device, as viewed in FIG. 3, and bolts 128 and 130 at the forward end of the bracket. Bolts 125 and 128 are rigidly secured to the ends of horizontal plate 66 and to the end of members 120 and 121. Cross members 122 and 124 are secured firmly against the under side of the trailer frame by nuts 132 and 134 on the respective front and rear bolts. When the nuts are tightened, the frame bracket 62 rigidly holds housing 60 in its operating position along the side of the frame member.

In the operation of the present load equalizing trailer hitch, after it has been assembled and mounted on the trailer in the manner illustrated in FIGS. 1, 2 and 3 of the drawings, the two bars retain the two vehicles in a substantially level relationship to one another on a level road. This level relationship can be easily obtained and adjusted, in accordance with the variations in the load between the two vehicles, by rotating nut 87 in one direction or the other on shaft 85 to raise or lower the end of the respective load distributing bar. Likewise, the load can be readily equalized between the two bars by properly adjusting the nut 87 on the threaded shaft. As the towing vehicle negotiates a turn and the vehicles move angularly to one another, for example, as the towing vehicle turns to the right, bar 40 moves rearwardly and bar 42 moves forwardly. As this movement takes place, the undersurface of the bar rests on plate 100, in frictional contact with the upper surface of the plate, and hence resists the endwise movement of the bars on the respective plate, thus tending to stabilize the two vehicles while the turn is being made. This stabilizing operation is performed without placing substantial stress on the vehicle frame member, and operating consistently, regardless of the speed of the vehicles or the magnitude of the angle involved in the turn. Side sway and whipping are likewise minimized by the operation of the support device when the two vehicles are moving in a straight line, thus permitting the driver to maintain effective control of the two vehicles in any normal operating position thereof.

The resilient members 102 permit the bars to adjust to variations in load from time to time without creating shock; hence, these rubber members form, in effect, shock absorbers, which provide a smooth operating relationship between the two vehicles without sacrificing the effective load distributing function of the bars. The bars may be somewhat flexible, but are preferably substantially rigid, and the yield for absorbing variations in the load in the normal operation of the two vehicles is performed by the resilient member 102. Although resilient member 102 is preferably of rubber or rubber-like material, compression springs under the friction plate 100 may be used.

While only one embodiment of the present load distributing trailer hitch has been described in detail herein, various changes and modifications may be made without departing from the scope of the invention.

I claim:

1. In a load distributing trailer hitch having a ball mount and two rearwardly extending load distributing bars connected to the ball mount on substantially vertical axes in laterally spaced relation to the ball: a support device for the rear end of each of said bars, comprising a carriage adjustable to various vertical positions and having a friction plate for supporting the bar and for resisting endwise movement of the bar thereon, a frame for supporting and guiding said carriage, means for moving said carriage vertically with respect to said frame, a resilient means in said carriage supporting said plate, and a bracket means for rigidly securing said frame to the trailer.

2. A load distributing trailer hitch as defined in claim 1 in which said frame includes a housing rigidly secured to said brackets and having vertical slots on opposite sides thereof for receiving the bars.

3. A load distributing trailer hitch as defined in claim 1 in which said carriage includes a body having openings therethrough for receiving the bar and retaining said friction plate in operative position.

4. A load distributing trailer hitch as defined in claim 3 in which said resilient means is mounted in said body and yieldably supports said friction plate.

5. A load distributing trailer hitch as defined in claim 4 in which said resilient means is constructed of rubber-like material.

6. A load distributing trailer hitch as defined in claim 1 in which said plate is movable vertically by variation in pressure applied to the friction plate by the bar.

7. A load distributing trailer hitch as defined in claim 6 in which a vertically positioned threaded shaft interconnects said carriage and frame and a nut on said threaded shaft vertically adjusts said carriage vertically within said frame.

8. A load distributing trailer hitch as defined in claim 1 in which said resilient means is constructed of rubber-like material.

9. A load distributing trailer hitch as defined in claim 1 in which a vertically positioned threaded shaft interconnects said carriage and frame and a nut on said threaded shaft vertically adjusts said carriage vertically with said frame.

10. A load distributing trailer hitch as defined in claim 1 in which said frame includes a housing substantially enclosing said carriage and supporting said carriage in various adjusted positions.

References Cited

UNITED STATES PATENTS

| 2,808,272 | 10/1957 | Reese | 280—406 |
| 3,194,584 | 7/1965 | Reese | 280—406 |
| 3,294,421 | 12/1966 | Mathisen | 280—446 |
| 3,306,628 | 2/1967 | Haxton | 280—406 |
| 3,347,561 | 10/1967 | Hedgepeth | 280—406 |
| 3,403,928 | 10/1968 | Laughlin | 280—406 |

LEO FRIAGLIA, Primary Examiner

U.S. Cl. X.R.

280—446, 489